United States Patent
Akiyama (10) Patent No.: US 10,606,157 B2
(45) Date of Patent: Mar. 31, 2020

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/249,082

(22) Filed: Jan. 16, 2019

(65) Prior Publication Data
US 2019/0219913 A1      Jul. 18, 2019

(30) Foreign Application Priority Data

Jan. 17, 2018   (JP) ................... 2018-005838

(51) Int. Cl.
  *G03B 21/20*   (2006.01)
  *G03B 21/00*   (2006.01)

(52) U.S. Cl.
  CPC ....... *G03B 21/2013* (2013.01); *G03B 21/008* (2013.01); *G03B 21/208* (2013.01); *G03B 21/2033* (2013.01)

(58) Field of Classification Search
  CPC .............. G03B 21/2013; G03B 21/008; G03B 21/2033; G03B 21/208
  See application file for complete search history.

(56) References Cited

U.S. PATENT DOCUMENTS

| | | | |
|---|---|---|---|
| 2008/0101429 A1* | 5/2008 | Sipes ................... | G02B 6/4296 372/50.12 |
| 2008/0278691 A1 | 11/2008 | Willemsen et al. | |
| 2010/0231862 A1* | 9/2010 | Itoh .................... | G02B 27/0994 353/31 |
| 2010/0309439 A1* | 12/2010 | Bi ...................... | G03B 21/2033 353/33 |
| 2016/0085143 A1* | 3/2016 | Hu ..................... | G03B 21/2013 362/553 |
| 2017/0175989 A1* | 6/2017 | Yamagishi ............ | G03B 33/08 |

FOREIGN PATENT DOCUMENTS

JP    2009-520233 A    5/2009

* cited by examiner

*Primary Examiner* — Isiaka O Akanbi
*Assistant Examiner* — Danell L Owens
(74) *Attorney, Agent, or Firm* — Oliff PLC (57) ABSTRACT

An illuminator according to an aspect of the invention includes a light source apparatus including a first light emitter that emits first light having a first color, a plurality of second light emitters that each emit second light having a second color, and a plurality of third light emitters that each emit third light having a third color, a rod integrator that combines the first light, the second light, and the third light with one another, a first lens that causes the first light, the second light, and the third light to be focused in the rod integrator, and a second lens that transmits only the first light out of the first light, the second light, and the third light. The plurality of second light emitters and the plurality of third light emitters are so disposed as to surround the first light emitter.

18 Claims, 5 Drawing Sheets

ILLUMINATOR AND PROJECTOR

BACKGROUND

1. Technical Field

The present invention relates to an illuminator and a projector.

2. Related Art

In recent years, to enhance the performance of a projector, attention has been directed to a projector using a laser light source, which is a light source having a wide color gamut and is highly efficient. JP-T-2009-520233 discloses a projector including a rod integrator for mixing red light, green light, and blue light emitted from laser light sources with one another and homogenizing the intensity of the mixed light.

Since the light emission efficiency of a laser light source varies on an emitted light color basis, the number of laser light sources necessary for white balance appropriate for image display varies on an emitted light color basis. In general, the light emission efficiency of a blue laser light source is higher than the light emission efficiency of each of a green laser light source and a red laser light source. The number of laser light sources necessary for generation of white light is therefore formed of a smaller number of green laser light sources and larger numbers of green laser light sources and red laser light sources.

In a case where the rod integrator disclosed in JP-T-2009-520233 is used to combine light beams emitted from laser light sources that emit light fluxes having different colors, the number of blue laser light sources is smaller than the numbers of green laser light sources and red laser light sources. Therefore, at the light incident end surface of the rod integrator, the angle of incidence of the blue light is smaller than the angles of incidence of the green light and the red light. As a result, the intensity of the blue light cannot be sufficiently homogenized as compared with the intensity of each of the green light and the red light, resulting in a problem of color unevenness in an image. The problem can be solved by increasing the overall length of the rod integrator. In this case, however, the size of the illuminator undesirably increases.

SUMMARY

An advantage of some aspects of the invention is to provide a compact illuminator that outputs light having a small degree of color unevenness. Another advantage of some aspects of the invention is to provide a projector that excels in image quality.

An illuminator according to an aspect of the invention includes a light source apparatus including one or more first light emitters that each emit first light having a first color in a first direction, a plurality of second light emitters that each emit second light having a second color different from the first color in the first direction, and a plurality of third light emitters that each emit third light having a third color different from the first and second colors in the first direction, a rod integrator that is provided on a light exiting side of the light source apparatus and combines the first light, the second light, and the third light with one another, a first lens that is provided on the light exiting side of the light source apparatus and causes the first light, the second light, and the third light to be focused in the rod integrator, and a second lens that is provided on the light exiting side of the light source apparatus and transmits only the first light out of the first light, the second light, and the third light. The plurality of second light emitters and the plurality of third light emitters are so disposed as to surround the one or more first light emitters when the light source apparatus is viewed along the first direction.

In the illuminator according to the aspect of the invention, the plurality of second light emitters and the plurality of third light emitters are so disposed as to surround the one or more first light emitters. Therefore, if no second lens is present, the angle of incidence of the first light incident on the light incident end surface of the rod integrator is smaller than the angles of incidence of the second light and the third light incident on the light incident end surface. However, since the second lens, which transmits only the first light, is provided, the angle of incidence of the first light is allowed to be close enough to the angles of incidence of the second light and the third light, whereby the intensity distribution of the first light is allowed to match with the intensity distributions of the second light and the third light on the light exiting end surface of the rod integrator. Color unevenness in the light that exits out of the rod integrator can therefore be suppressed with no increase in the overall length of the rod integrator.

In the illuminator according to the aspect of the invention, a light emission efficiency of each of the one or more first light emitters may be higher than a light emission efficiency of each of the plurality of second light emitters and a light emission efficiency of each of the plurality of third light emitters, the number of plurality of second light emitters may be greater than the number of one or more first light emitters, and the number of plurality of third light emitters may be greater than the number of one or more first light emitters.

According to the configuration described above, since the number of first light emitters, which each have high light emission efficiency, is small, and the numbers of second light emitters and third light emitters, which each have low light emission efficiency are large, a satisfactory color balance of the light from the light source apparatus is readily achieved. That is, the white balance of the light that exits out of the light source apparatus can be readily adjusted.

In the illuminator according to the aspect of the invention, the first light may be blue light, the second light may be green light, and the third light may be red light.

According to the configuration described above, a compact illuminator capable of outputting white light can be achieved.

In the illuminator according to the aspect of the invention, the plurality of second light emitters may be so provided rotationally symmetric around a central axis of the first light as to surround the one or more first light emitters, and the plurality of third light emitters may be so provided rotationally symmetric around the central axis of the first light as to surround the one or more first light emitters.

According to the configuration described above, the size of the light source apparatus can be reduced. Further, the central axis of the second light having the second color and formed by the plurality of second light emitters coincides with the central axis of the first light having the first color. Similarly, the central axis of the third light having the third color and formed by the plurality of third light emitters coincides with the central axis of the first light. In the present specification, the central axis of the spread (distribution) of light is referred to as the central axis of the light.

In the illuminator according to the aspect of the invention, the second lens may be so disposed that a central axis of the second lens coincides with the center axis of the first light.

According to the configuration described above, the second lens is readily so disposed as to transmit only the first light.

In the illuminator according to the aspect of the invention, the second lens may be a spherical convex lens or a spherical concave lens.

According to the configuration described above, when the first light passes through the spherical convex lens or the spherical concave lens, the angle of incidence of the first light incident on the light incident end surface of the rod integrator increases.

In the illuminator according to the aspect of the invention, the second lens may be an anamorphic convex lens or an anamorphic concave lens.

According to the configuration described above, when the first light passes through the anamorphic convex lens or the anamorphic concave lens, the angle of incidence of the first light incident on the light incident end surface of the rod integrator increases.

In the illuminator according to the aspect of the invention, the first light emitters, the second light emitters, and the third emitters may each include a semiconductor laser chip, and the anamorphic convex lens or the anamorphic concave lens may be so configured that power of the lens in a lengthwise direction of a light emission surface of the semiconductor laser chip is greater than power of the lens in a widthwise direction of the light emission surface.

In general, the divergence angle of light emitted through the light emission surface of a semiconductor laser chip varies in accordance with the direction of the emitted light, and the divergence angle in the lengthwise direction of the light emission surface is smaller than the divergence angle in the widthwise direction of the light emission surface. Therefore, according to the configuration described above, the angle of incidence of the first light incident on the light incident end surface of the rod integrator can be increased both in the lengthwise direction and the widthwise direction of the light emission surface.

In the illuminator according to the aspect of the invention, the first lens and the second lens may be integrated with each other.

According to the configuration described above, the number of parts of the illuminator and the size thereof can be reduced.

A projector according to another aspect of the invention includes the illuminator according to the aspect of the invention, a light modulator that modulates light from the illuminator in accordance with image information to form image light, and a projection optical apparatus that projects the image light.

The projector according to the aspect of the invention, which includes the illuminator according to the aspect of the invention, can project an image having a small amount of color unevenness.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 5.

Figure 1:
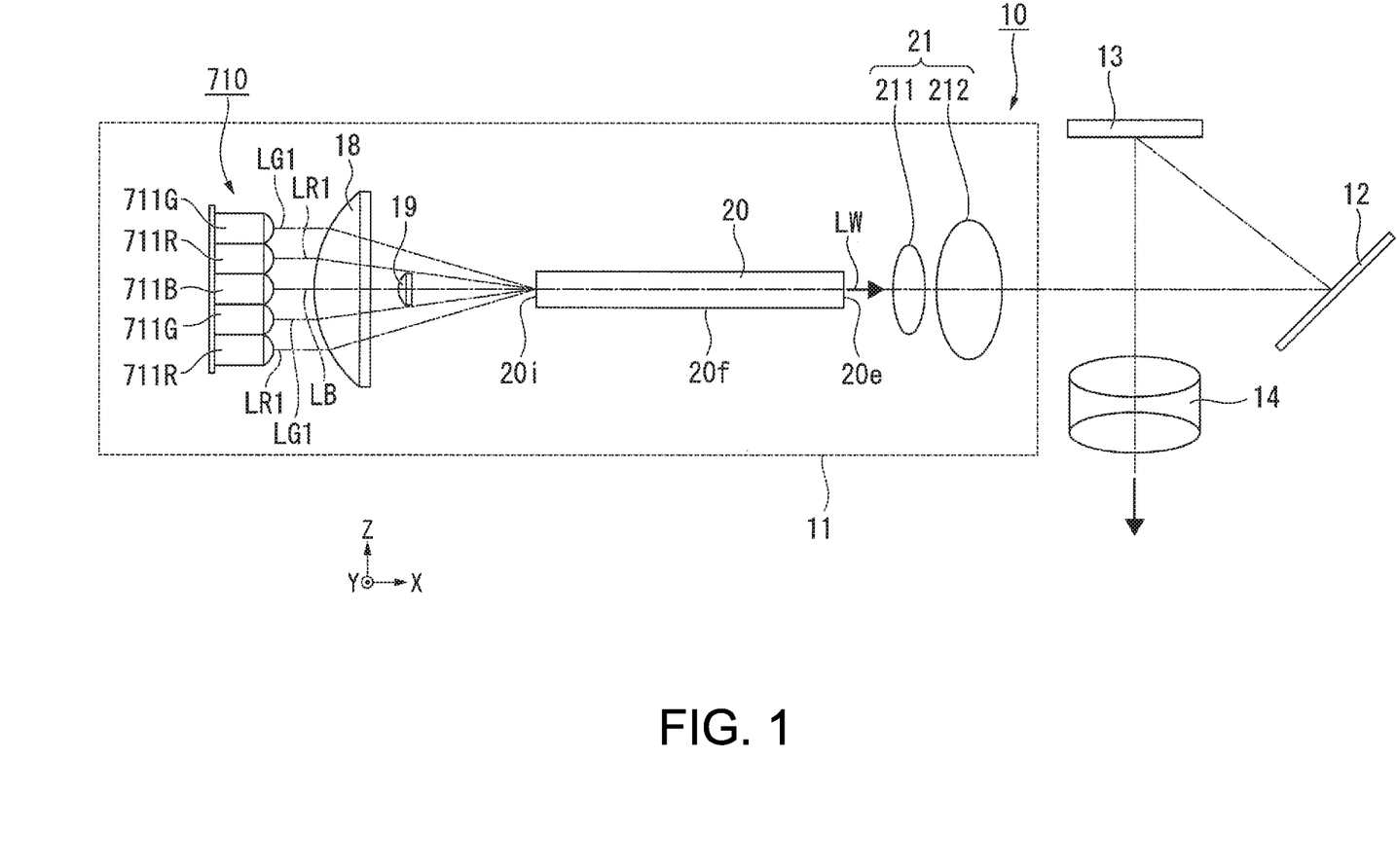
FIG. 1 is a schematic configuration diagram of a projector according to a first embodiment.

FIG. 1 is a schematic configuration diagram of a projector according to the first embodiment.

In the following drawings, each component is drawn at a different dimensional scale depending on the component in some cases for clarity of the component. In the drawings, the direction in which an illuminator outputs light is an X-axis direction, and the directions perpendicular to each other in a plane perpendicular to the X-axis direction are a Y-axis direction and a Z-axis direction.

A projector 10 according to the present embodiment includes an illuminator 11, a light guide system 12, a micromirror-type light modulator 13, and a projection optical apparatus 14, as shown in FIG. 1. The illuminator 11 includes a light source apparatus 710, a light focusing lens 18 (first lens), a blue light adjustment lens 19 (second lens), a rod integrator 20, and a pickup system 21.

Figure 2:
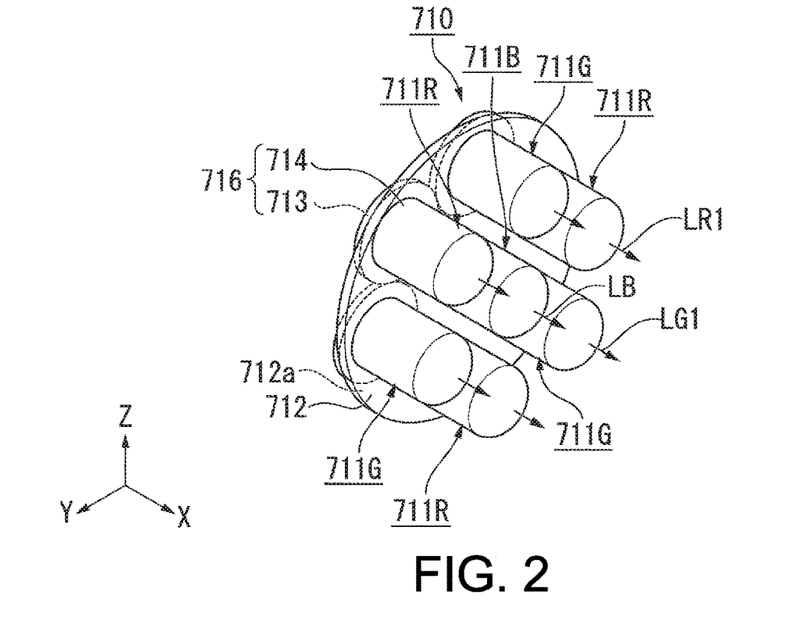
FIG. 2 is a perspective view of a light source apparatus.

FIG. 2 is a perspective view of the light source apparatus 710. In FIG. 2, mount seats of part of semiconductor lasers are omitted for clarity of the figure.

Figure 3:
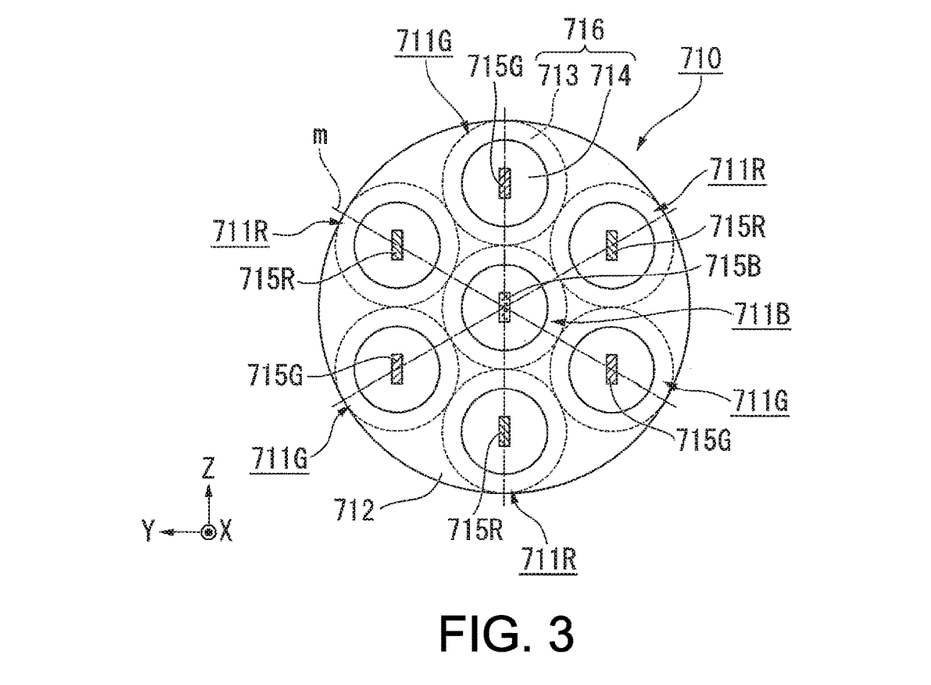
FIG. 3 is a front view of the light source apparatus.

FIG. 3 is a front view of the light source apparatus 710 viewed along the X-axis direction.

The light source apparatus 710 includes one or more blue semiconductor lasers 711B (first light emitters), a plurality of green semiconductor lasers 711G (second light emitters), and a plurality of red semiconductor lasers 711R (third light emitters), as shown in FIGS. 2 and 3.

In the present embodiment, the light source apparatus 710 includes one blue semiconductor laser 711B, three green semiconductor lasers 711G, and three red semiconductor lasers 711R. The reason why the numbers of semiconductor lasers that emit light beams having the colors described above are preferably set as described above will be described later.

The light source apparatus 710, however, may include a plurality of blue semiconductor lasers 711B in some cases, that is, only needs to include one or more blue semiconductor lasers 711B. The numbers of green semiconductor lasers 711G and red semiconductor lasers 711R are not necessarily three. The number of green semiconductor lasers 711G may differ from the number of red semiconductor lasers 711R.

The blue semiconductor laser 711B emits blue light LB (first light having first color) in the X-axis direction (first direction). The green semiconductor lasers 711G each emit a green light beam LG1 in the X-axis direction. The red semiconductor lasers 711R each emit a red light beam LR1 in the X-axis direction. That is, the blue semiconductor laser 711B, the green semiconductor lasers 711G, and the red semiconductor lasers 711R emit color light beams LB, LG1, and LR1 having different colors in the same direction. The light source apparatus 710 outputs the three color light beams LB, LG1, and LR1, as described above.

In the following description, the three green light beams LG1 emitted from the three green semiconductor lasers 711G are collectively taken as one green light flux, which is called green light LG (second light having second color). Similarly, the three red light beams LR1 emitted from the three red semiconductor lasers 711R are collectively taken as one red light flux, which is called red light LR (third light having third color).

The blue semiconductor laser 711B, the green semiconductor lasers 711G, and the red semiconductor lasers 711R are each formed of a CAN-package-type semiconductor laser. Each package 716, which is formed of a mount seat 713 and a can element 714, as shown in FIG. 2, accommodates a semiconductor laser chip 715B, a semiconductor laser chip 715G, or a semiconductor laser chip 715R, as shown in FIG. 3. In the present embodiment, the blue semiconductor laser 711B, the green semiconductor lasers 711G, and the red semiconductor lasers 711R each include the same package 716 and may, however, instead include packages different from one another.

Since the light emission efficiency of a semiconductor laser chip varies on an emitted light color basis, the optical output from a semiconductor laser varies on an emitted light color basis. That is, the light emission efficiency of the blue semiconductor laser 711B is higher than the light emission efficiency of the green semiconductor lasers 711G and the light emission efficiency of the red semiconductor lasers 711R. Even in a case where the light emission efficiency of a semiconductor laser chip is relatively low, increasing the supplied electric power inputted to the semiconductor laser chip can increase the output of the light emitted from the semiconductor laser chip. An increase in the supplied electric power is, however, not preferable because the increase increases the temperature of the semiconductor laser chip, resulting in a decrease in the light emission efficiency and life of the semiconductor laser chip. Therefore, provided that the same electric power is supplied, the optical output from the blue semiconductor laser 711B is higher than the optical output from each of the green semiconductor lasers 711G and the optical output from each of the red semiconductor lasers 711R.

As an example, according to the website of Nichia Corporation, Product Information, "laser diode (LD)," [online], [searched on Dec. 21, 2017], Internet <URL:http://www.nichia.co.jp/jp/product/laser.html>, the optical output from the blue semiconductor laser (model name: NDB7K75) is, for example, 3.5 W (at working temperature: 25° C.), and the optical output from the green semiconductor laser (model name: NDG7K75T) is, for example, 1 W (at working temperature: 25° C.). Although not described in the website described above, a blue semiconductor laser array (model name: NUBM08-02) is provided, and the blue semiconductor laser array includes a plurality of blue semiconductor lasers each having an optical output of 4.5 W (at 25° C.)

According to the website of Mitsubishi Electric Corporation, News Releases, "Mitsubishi Electric to Launch High-power 639-nm Red Laser Diode for Projectors," [online], [searched on Dec. 21, 2017], Internet <URL: http://www-.mitsubishielectric.co.jp/news/2016/1214.html>, the optical output from the red semiconductor laser (model name: ML562G85) is, for example, 2.1 W (at 25° C.)

The optical outputs described above at the temperature of 25° C. are converted into optical outputs at an actual working temperature of 45° C., and Table 1 below shows the optical output of the light emitted from each of the color semiconductor lasers (CAN-package-type semiconductor lasers).

TABLE 1

|  | Color | | | |
| --- | --- | --- | --- | --- |
|  | R | G | B | B |
| Model name | ML562G85 | NDG7K75T | NDB7K75 | NUBM08-02 |
| Center wavelength [nm] | 640 | 520 | 455 | 450 |
| Optical output [W/laser] | 1.26 | 0.8 | 2.8 | 4.1 |

That is, the optical output from one blue semiconductor laser (model name: NDB7K75) is 2.8 W, the optical output from one blue semiconductor laser that forms the blue semiconductor laser array (model name: NUBM08-02) is 4.1 W, the optical output from one green semiconductor laser (model name: NDG7K75T) is 0.8 W, and the optical output from one red semiconductor laser (model name: ML562G85) is 1.26 W.

On the other hand, Table 2 below shows the optical output from each of the sets of color semiconductor lasers necessary for generation of white light (color temperature: 6500K) having a brightness of 1000 lm, 2000 lm, and 3000 lm and the number of color semiconductor lasers (CAN-package-type semiconductor lasers) for generation of the white light.

TABLE 2

| Product brightness | Necessary optical output [W] | | | Necessary number of semiconductor lasers | | |
| --- | --- | --- | --- | --- | --- | --- |
| [lm] | R | G | B | R | G | B |
| 3000 | 8.7 | 6.1 | 3.7 | 8 | 9 | 1 |
| 2000 | 5.83 | 4.06 | 2.46 | 6 | 6 | 1 |
| 1000 | 2.92 | 2.03 | 1.23 | 3 | 3 | 1 |

The optical output from each of the sets of color semiconductor laser necessary for generation of white light having the brightness of 1000 lm is 1.23 W from the blue semiconductor laser, 2.03 W from the green semiconductor lasers, and 2.92 W from the red semiconductor lasers, as shown in the lowermost row of Table 2. Based on the necessary optical output values [W] in Table 2 and the optical outputs per semiconductor laser [W/laser] in Table 1, the numbers of semiconductor lasers necessary for generation of the white light having the brightness of 1000 lm are calculated as follows: one blue semiconductor laser (model name: NDB7K75); three green semiconductor lasers (model name: NDG7K75T); and three red semiconductor lasers (model name: ML562G85). The numbers coincide with the numbers of semiconductor lasers 711B, 711G, and 711R in the light source apparatus 710 in the present embodiment. It is, however, noted in Table 2 that one blue semiconductor laser that forms the blue semiconductor laser array (model name: NUBM08-02) is used to achieve the brightness of 3000 lm.

The description above shows that the optical output from the light source apparatus 710 in the present embodiment is suitable for a light source apparatus of a projector that outputs a light flux having a brightness of about 1000 lm.

In a case where one semiconductor laser is formed of one semiconductor laser chip, the light emission efficiency of the semiconductor laser is equal to the light emission efficiency of the semiconductor laser chip. In a case where one semiconductor laser is formed of a plurality of semiconductor laser chips, the light emission efficiency of the semiconductor laser is equal to the overall light emission efficiency of the semiconductor laser chips.

According to surmise made by the present inventor, progress of the semiconductor laser technology in the future is likely to increase the optical outputs from the color semiconductor lasers 711B, 711G, and 711R beyond the numerical values described above. Even in this case, however, the ratio among the numbers of color semiconductor lasers 711B, 711G, and 711R necessary for generation of white light does not change. Therefore, in the present embodiment, the light source apparatus 710 including one blue semiconductor laser 711B, three green semiconductor lasers 711G, and three red semiconductor lasers 711R is presented by way of example. It is, however, noted that the numbers of semiconductor lasers are not limited to those in the example described above.

A holding member 712 is formed of a circular plate provided with seven holes corresponding to the number of a plurality of semiconductor lasers 711B, 711G, and 711R and each corresponding to the dimension of the can element 714. The plate is not necessarily made of a specific material but is desirably made, for example, of a metal having high thermal conductivity. The plurality of semiconductor lasers 711B, 711G, and 711R are so supported by the holding member 712 that one surface of each of the base seats 713 is in contact with a first surface 712a of the holding member 712 with the can elements 714 inserted into one of the holes of the holding member 712. The first surface 712a of the holding member 712 faces away from the side from which the plurality of semiconductor lasers 711B, 711G, and 711R supported by the holding member 712 emit the light beams.

Out of the plurality of semiconductor lasers 711B, 711G, and 711R, the blue semiconductor laser 711B is so disposed on the holding member 712 as to be located at the center of the light source apparatus 710, as shown in FIG. 3. The plurality of green semiconductor lasers 711G and the plurality of red semiconductor lasers 711R are so disposed in a region around the blue semiconductor laser 711B as to surround the blue semiconductor laser 711B.

The green semiconductor lasers 711G and the red semiconductor lasers 711R are so disposed on the holding member 712 as to be located along an imaginary circle around the blue semiconductor laser 711B. The green semiconductor lasers 711G and the red semiconductor lasers 711R are alternately provided along the circumferential direction of the imaginary circle.

The center of the imaginary circle may coincide with the center axis of the blue light LB from the blue semiconductor laser 711B. The center axis of the red light beam LR1 emitted by each of the red semiconductor lasers 711R may intersect the imaginary circle. The center axis of the green light beam LG1 emitted by each of the green semiconductor lasers 711G may intersect the imaginary circle.

In the light source apparatus 710 having the arrangement described above, the angles between a plurality of straight lines m, which connect the light emission centers of the blue semiconductor laser 711B, the green semiconductor lasers 711G, and the red semiconductor lasers 711R, are equal to each other and are each 60°. The three straight lines m form angles around the center axis of the blue light LB from the blue semiconductor laser 711B, and fan-shaped arcs having the thus formed angles as the subtended angles have the same length. The subtended angles of the plurality of fan-like shapes are equal to one another and are each 60°. Similarly, the three straight lines m form angles at the semiconductor laser chip 715B and in the vicinity thereof, and fan-shaped arcs having the thus formed angles as the subtended angles have the same length. The subtended angles of the plurality of fan-like shapes are equal to one another and are each 60°.

In the plurality of semiconductor lasers 711B, 711G, and 711R, the base seats 713 of the packages 716 that accommodate semiconductor lasers adjacent to each other are in contact with each other. The base seats 713 of the packages 716, which accommodate the plurality of semiconductor lasers 711B, 711G, and 711R, may not be in contact with each other. That is, the center axis of the red light beam LR1 emitted by each of the red semiconductor lasers 711R and the center axis of the green light beam LG1 emitted by each of the green semiconductor lasers 711G may be alternately disposed at equal intervals along the imaginary circle.

As described above, the plurality of green semiconductor lasers 711G are so provided in the region around the blue semiconductor laser 711B as to be rotationally symmetric around the center axis of the blue light LB. The plurality of red semiconductor lasers 711R are so provided in the region around the blue semiconductor laser 711B as to be rotationally symmetric around the center axis of the blue light LB. The configuration in which the plurality of green semiconductor lasers 711G are so provided as to be rotationally symmetric around the center axis of the blue light LB and surround the blue semiconductor laser 711B only needs to satisfy the arrangement and positional relationship described above. Similarly, the configuration in which the plurality of red semiconductor lasers 711R are so provided as to be rotationally symmetric around the center axis of the blue light LB and surround the blue semiconductor laser 711B only needs to satisfy the arrangement and positional relationship described above.

The blue semiconductor laser 711B, the green semiconductor lasers 711G, and the red semiconductor lasers 711R are so disposed that the semiconductor laser chips 715B, 715G, and 715R (long edges of rectangular semiconductor laser chips) are oriented in the same direction. In the example shown in FIG. 3, the blue semiconductor laser 711B, the green semiconductor lasers 711G, and the red semiconductor lasers 711R are so disposed that the longitudinal direction W1 (see FIG. 4) of a light emission surface 715c of each of the semiconductor laser chips 715G and 715R is parallel to the axis Z.

Figure 4:
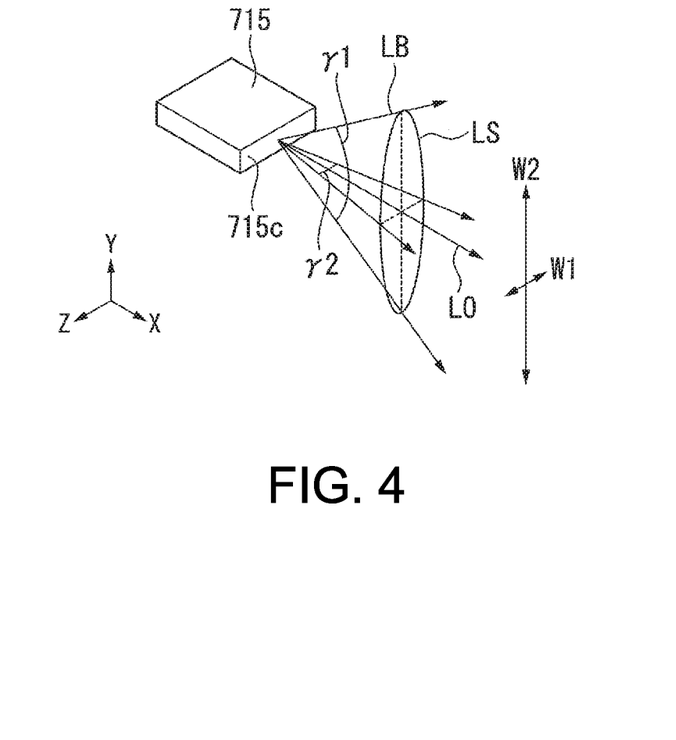
FIG. 4 is a perspective view of a semiconductor laser chip.

FIG. 4 is a perspective view of one of the semiconductor laser chips 715. The blue semiconductor laser chip 715B, the green semiconductor laser chips 715G, and the red semiconductor laser chips 715R have the same configuration, and the blue semiconductor laser chip 715B, the green semiconductor laser chips 715G, and the red semiconductor laser chips 715R will be collectively called semiconductor laser chips 715 in the following description.

The semiconductor laser chip 715 each have the light emission surface 715c, through which light is emitted, as shown in FIG. 4. The light emission surface 715c has an oblong plan shape having a lengthwise direction W1 and a widthwise direction W2 when viewed along a center axis L0 of emitted light LB. The ratio of the dimension of the light emission surface 715c in the lengthwise direction W1 to the dimension of the light emission surface 715c in the widthwise direction W2 (W1/W2) is preferably 30/1 or greater. In the present embodiment, the dimension of the light emission surface 715c in the lengthwise direction W1 is, for example, 40 μm, and the dimension of the light emission surface 715c in the widthwise direction W2 is, for example, 1 μm. The shape and dimensions of the light emission surface 715c are not limited to those described above.

The semiconductor laser chips 715 each emit light LB having an elliptical cross section LS. The lengthwise direction W1 of the light emission surface 715c coincides with the minor axis of the elliptical shape, and the widthwise direction W2 of the light emission surface 715c coincides with the major axis of the elliptical shape. That is, the light LB emitted from each of the semiconductor laser chips 715 has a divergence angle γ1 in a plane perpendicular to the lengthwise direction W1 of the light emission surface 715c and a divergence angle γ2 in a plane perpendicular to the widthwise direction W2 of the light emission surface 715c with the divergence angle γ1 greater than the divergence angle γ2. The divergence angle γ1 of the light LB is, for example, 70° at the maximum (maximum radiation angle), and the divergence angle γ2 of the light LB is, for example, 20° at the maximum (maximum radiation angle).

The light source apparatus 710 having the configuration described above outputs the red light LR, the green light LG, and the blue light LB in a time division manner and cause them to sequentially enter the light modulator 13.

The light focusing lens 18 is provided on the light exiting side of the light source apparatus 710, as shown in FIG. 1. The light focusing lens 18 is formed of a spherical convex lens having a flat surface and a convex surface. The light focusing lens 18 is so provided that the center axis thereof coincides with the center axis of the blue light LB emitted from the blue semiconductor laser 711B. The light focusing lens 18 causes the red light LR, the green light LG, and the blue light LB outputted from the light source apparatus 710 to be focused in the rod integrator 20.

Figure 5:
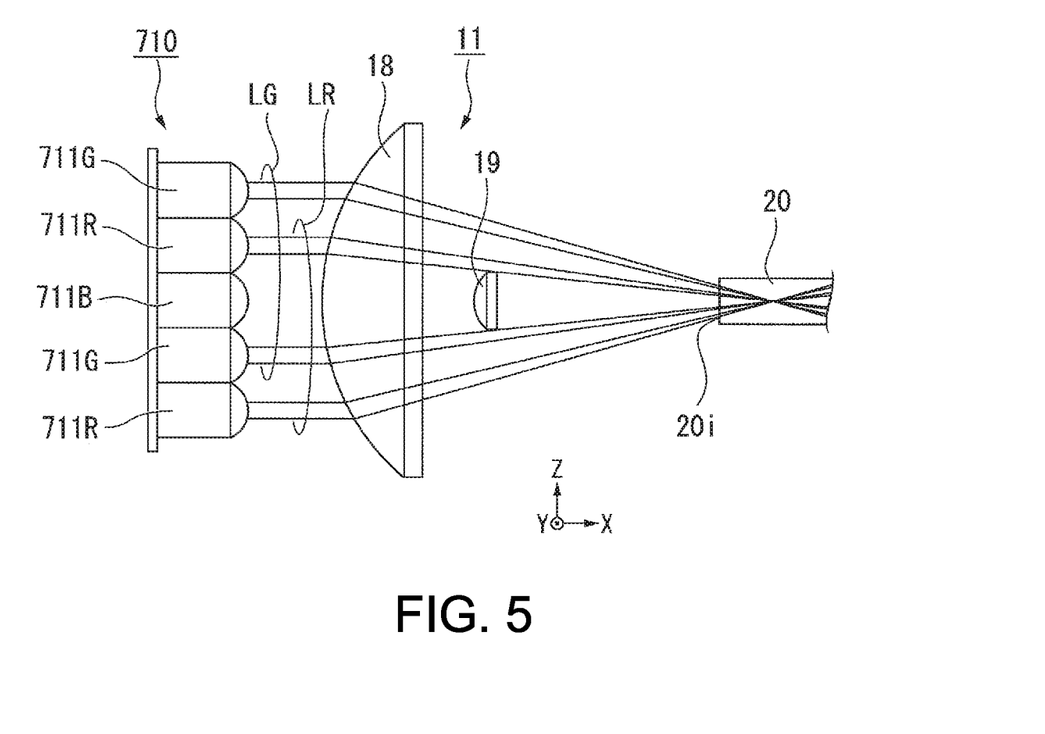
FIG. 5 shows that green light and red light enter a rod integrator.

The blue light adjustment lens 19 is provided on the light exiting side of the light source apparatus 710. More specifically, the blue light adjustment lens 19 is provided between the light focusing lens 18 and the rod integrator 20. The blue light adjustment lens 19 is formed of a spherical convex lens having a flat surface and a convex surface. The blue light adjustment lens 19 is so sized that the red light LR emitted from the red semiconductor lasers 711R or the green light LG emitted from the green semiconductor lasers 711G does not enter the blue light adjustment lens 19, and the blue light adjustment lens 19 is so provided that the center axis thereof coincides with the center axis of the blue light LB emitted from the blue semiconductor laser 711B, as shown in FIG. 5, which will be described later.

The thus configured blue light adjustment lens 19 transmits only the blue light LB out of the blue light LB, the green light LG, and the red light LR outputted from the light source apparatus 710. The blue light adjustment lens 19 only needs to be so positioned as to transmit only the blue light LB and may therefore instead be, for example, so provided between the light source apparatus 710 and the light focusing lens 18 that the center axis of the blue light adjustment lens 19 coincides with the center axis of the blue light LB.

The rod integrator 20 is provided on the light exiting side of the light source apparatus 710. The rod integrator 20 is formed of a quadrangular columnar light transmissive member. The rod integrator 20 has a light incident end surface 20i, on which a plurality of light fluxes LB, LG, and LR from the color semiconductor lasers 711B, 711G, and 711R are incident, a light exiting end surface 20e, which faces away from the light incident end surface 20i, and four reflection surfaces 20f. The light incident end surface 20i and the light exiting end surface 20e have the same area, and the four reflection surfaces 20f are parallel to each other. That is, the rod integrator 20 in the present embodiment is formed of a non-tapered rod integrator.

The blue light LB, the green light LG, and the red light LR are combined with one another in the rod integrator 20, and the combined light exits through the light exiting end surface 20e. The light containing the blue light LB, the green light LG, and the red light LR transmits the rod integrator 20, which homogenizes the intensity distribution of the combined light. The rod integrator 20 in the present embodiment is formed of a solid light transmissive member and may instead be formed of a hollow tubular member having inner surfaces that serve as the reflection surfaces.

In the present embodiment, since the light source apparatus 710 outputs the blue light LB, the green light LG, and the red light LR in a time division manner, only one of the blue light LB, the green light LG, and the red light LR is outputted in a period shorter than the light emission period of each of the semiconductor lasers 711B, 711G, and 711R. It can, however, be said that the blue light LB, the green light LG, and the red light LR are combined with one another by the rod integrator 20 in a period longer than the light emission period of each of the semiconductor lasers 711B, 711G, and 711R. The plurality of light fluxes LB, LG, and LR combined with one another are hereinafter referred to as light LW.

The pickup system 21 is formed of a first convex lens 211 and a second convex lens 212. The pickup system 21 allows the light exiting end surface 20e of the rod integrator and the light modulator 13 to be optically conjugate with each other.

The light guide system 12 is formed of a reflection mirror. The light guide system 12 reflects the red light LR, the green light LG, and the blue light LB outputted from the light source apparatus 710 and causes the reflected light fluxes to enter the light modulator 13 in a time division manner.

A digital micromirror device (DMD) is, for example, used as the micromirror-type light modulator 13. A DMD has a configuration in which a plurality of micromirrors are arranged in a matrix. The DMD switches the inclination direction of each of the plurality of micromirrors from one to the other to quickly switch the direction in which the light incident on the DMD is reflected between the direction in which the reflected light enters the projection system 14 and the direction in which the reflected light does not enter the projection system 14. The thus configured light modulator 13 sequentially modulates the red light LR, the green light LG, and the blue light LB outputted from the light source apparatus 710 to produce a green image, a red image, and a blue image.

The projection system 14 projects the green image, the red image, and the blue image on a screen. The projection system 14 is formed of, for example, a plurality of projection lenses.

The effect of the illuminator 11 according to the present embodiment will be described with reference to FIGS. 5 and 6.

FIG. 5 shows that the green light LG and the red light LR enter the rod integrator 20. FIG. 6 shows that the blue light LB enters the rod integrator 20.

The green light LG emitted from the green semiconductor lasers 711G is focused by the light focusing lens 18 and incident on the light incident end surface 20i of the rod integrator 20, as shown in FIG. 5. In this process, the green light LG does not pass through the blue light adjustment lens 19 and is therefore not affected by the light focusing effect provided by the blue light adjustment lens 19. Similarly, the red light LR emitted from the red semiconductor lasers 711R is focused by the light focusing lens 18 and incident on the light incident end surface 20i of the rod integrator 20. In this process, the red light LR does not pass through the blue light adjustment lens 19 and is therefore not affected by the light focusing effect provided by the blue light adjustment lens 19.

Figure 6:
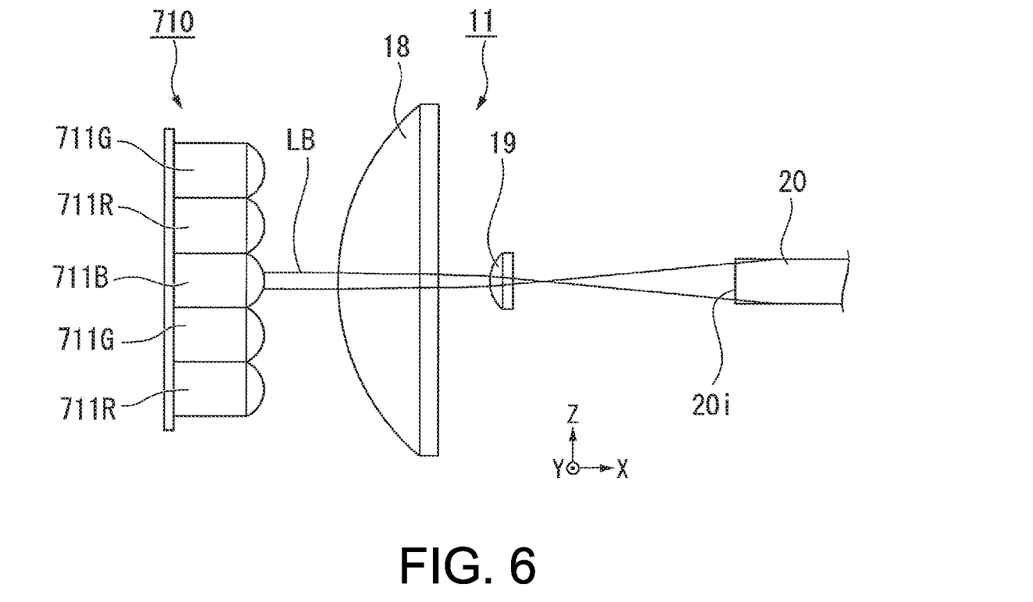
FIG. 6 shows that blue light enters the rod integrator.

The blue light LB emitted from the blue semiconductor laser 711B is focused by the light focusing lens 18 and incident on the light incident end surface 20i of the rod integrator 20, as shown in FIG. 6, as are the green light LG and the red light LR. Since the blue semiconductor laser 711B is disposed at the center of the light source apparatus 710, and the green semiconductor lasers 711G and the red semiconductor lasers 711R are disposed at the periphery of the light source apparatus 710, the angle of incidence of the blue light LB at the light incident end surface 20i is smaller than the angles of incidence of the green light LG and the red light LR at the light incident end surface 20i if no blue light adjustment lens 19 is present.

As a result, the intensity of the blue light LB is not sufficiently homogenized as compared with the intensity of each of the green light LG and the red light LR, resulting in color unevenness in an image. The problem of insufficient homogenization of the intensity of the blue light LB can be solved by increasing the overall length of the rod integrator 20 to increase the number of internal reflection actions of the blue light LB. In this case, however, the size of the illuminator undesirably increases.

In contrast, in the case of the illuminator 11 according to the present embodiment, the blue light LB having exited out of the light focusing lens 18 is caused by the blue light adjustment lens 19 to converge, then diverges after passing through the focal point of the blue light adjustment lens 19, and is incident on the light incident end surface 20i of the rod integrator 20. The angle of incidence of the blue light LB incident on the light incident end surface 20i is thus allowed to be close to the angles of incidence of the green light LG and the red light LR incident on the light incident end surface 20i, whereby the intensity of the blue light LB at the light exiting end surface 20e of the rod integrator 20 can be so homogenized as to be equal to the homogenized intensity of each of the green light LG and the red light LR. The color unevenness in the exiting light LW can thus be suppressed with no increase in the overall length of the rod integrator 20, whereby a compact illuminator 11 can be achieved.

In the light source apparatus 710 in the present embodiment, since the angles between the plurality of straight lines m, which connect the light emission centers of two adjacent ones of the semiconductor lasers 711B, 711G, and 711R to each other, are equal to one another, a satisfactory color balance of the light from the light source apparatus 710 is readily achieved, whereby the footprint of the light source apparatus 710 can be reduced. A compact light source apparatus 710 can therefore be achieved.

Further, since adjacent ones of the semiconductor lasers 711B, 711G, and 711R are so disposed that the packages 716 are in contact with each other, the semiconductor lasers 711B, 711G, and 711R can be disposed in a close-packed manner, whereby a more compact light source apparatus 710 can be achieved.

In the light source apparatus 710 in the present embodiment, the numbers of color semiconductor lasers 711B, 711G, and 711R are set based on the light emission efficiency of each of the color semiconductor lasers 711B, 711G, and 711R and the optical output from each of the sets of color semiconductor lasers 711B, 711G, and 711R necessary for generation of white light. That is, since the numbers of green semiconductor lasers 711G and red semiconductor lasers 711R, which each have relatively low light emission efficiency, are greater than the number of blue semiconductor lasers 711B, which each have relatively high light emission efficiency, a satisfactory color balance of the light from the light source apparatus 710 is readily achieved. A light source apparatus 710 that allows the white balance of the exiting light to be readily adjusted can thus be achieved.

The projector 10 according to the present embodiment, which includes the illuminator 11 described above, is compact and can project an image having a small amount of color unevenness.

Second Embodiment

A second embodiment of the invention will be described below with reference to FIG. 7.

The configuration of a projector according to the second embodiment is roughly the same as that in the first embodiment but differs therefrom in terms of the configuration of the illuminator. The overall projector will therefore not be described, and only different portions will be described.

Figure 7:
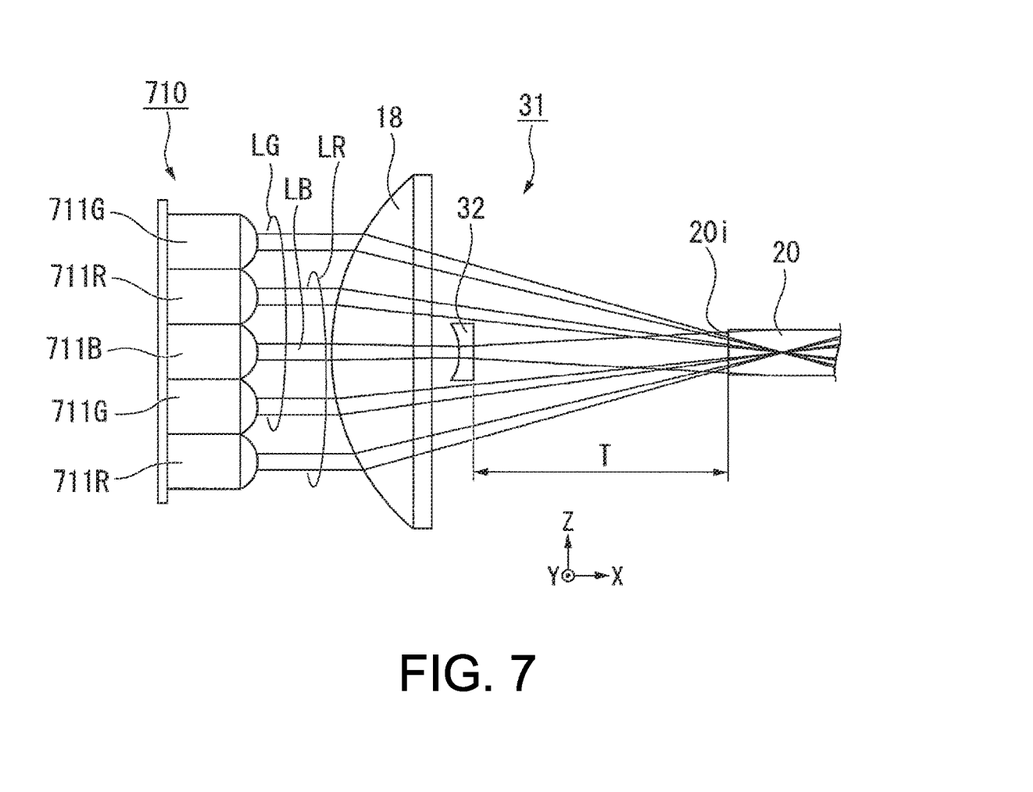
FIG. 7 is a schematic configuration diagram of an illuminator according to a second embodiment.

FIG. 7 is a schematic configuration diagram of an illuminator according to the second embodiment.

In FIG. 7, components common to those in the drawings used in the first embodiment have the same reference characters and will not be described.

In an illuminator 31 according to the present embodiment, a blue light adjustment lens 32 is formed of a spherical concave lens having a flat surface and a concave surface, as shown in FIG. 7. The blue light adjustment lens 32 is so sized that the red light LR emitted from the red semiconductor lasers 711R or the green light LG emitted from the green semiconductor lasers 711G does not enter the blue light adjustment lens 32, and the blue light adjustment lens 32 is so provided that the center axis thereof coincides with the center axis of the blue light LB emitted from the blue semiconductor laser 711B.

The thus configured blue light adjustment lens 32 transmits only the blue light LB out of the blue light LB, the green light LG, and the red light LR outputted from the light source apparatus 710. The blue light adjustment lens 32 only needs to be so positioned as to transmit only the blue light LB and may therefore instead be, for example, so provided between the light source apparatus 710 and the light focusing lens 18 that the center axis of the blue light adjustment lens 32 coincides with the center axis of the blue light LB. The other configurations of the illuminator 31 are the same as those in the first embodiment.

Also in the present embodiment, the same effect as that provided by the first embodiment, that is, the color unevenness can be suppressed with no increase in the overall length of the rod integrator 20, whereby a compact illuminator 31 can be achieved.

In the present embodiment, in particular, since a spherical concave lens is used as the blue light adjustment lens 32, the blue light LB is not focused between the blue light adjustment lens 32 and the rod integrator 20 but diverges immediately after it exits out of the blue light adjustment lens 32 and is incident on the light incident end surface 20i of the rod integrator 20. The distance T, which is the distance from the blue light adjustment lens 32 to the rod integrator 20 and is necessary for an increase in the angle of incidence of the blue light LB in such a way that the angle of incidence is so increased as to be roughly equal to the angles of incidence of the green light LG and the red light LR, can therefore be reduced as compared with the case where a spherical convex lens is used. The size of the illuminator 31 can thus be further reduced.

Third Embodiment

A third embodiment of the invention will be described below with reference to FIGS. 8 and 9.

The configuration of a projector according to the third embodiment is roughly the same as that in the first embodiment but differs therefrom in terms of the configuration of the illuminator. The overall projector will therefore not be described, and only different portions will be described.

Figure 8:
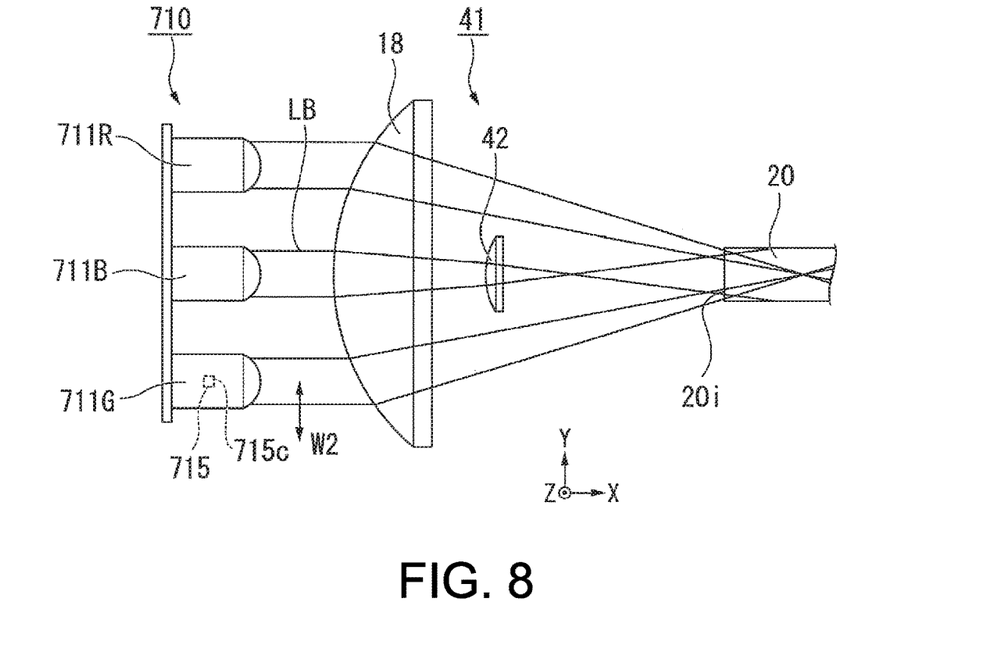
FIG. 8 shows an illuminator according to a third embodiment viewed along a Z-axis direction.

FIG. 8 shows an illuminator according to the third embodiment viewed along the Z-axis direction. FIG. 9 shows the illuminator according to the third embodiment viewed along the Y-axis direction.

Figure 9:
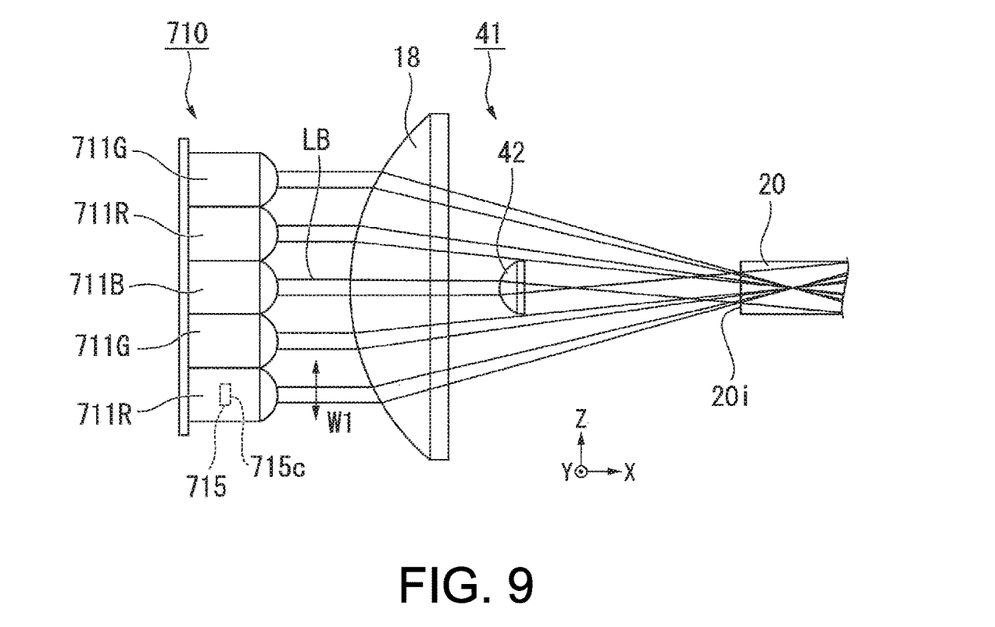
FIG. 9 shows the illuminator according to the third embodiment viewed along a Y-axis direction.

In FIGS. 8 and 9, components common to those in the drawings used in the first embodiment have the same reference characters and will not be described.

In an illuminator 41 according to the present embodiment, a blue light adjustment lens 42 is formed of an anamorphic convex lens formed of convex surfaces having different values of curvature in two directions perpendicular to each other in a plane perpendicular to the optical axis as shown in FIGS. 8 and 9. The blue light adjustment lens 42 is so sized that the red light LR emitted from the red semiconductor lasers 711R or the green light LG emitted from the green semiconductor lasers 711G does not enter the blue light adjustment lens 42, and the blue light adjustment lens 42 is so provided that the center axis thereof coincides with the center axis of the blue light LB emitted from the blue semiconductor laser 711B. The blue light adjustment lens 42 only needs to be so positioned as to transmit only the blue light LB and may therefore instead be, for example, so provided between the light source apparatus 710 and the light focusing lens 18 that the center axis of the blue light adjustment lens 42 coincides with the center axis of the blue light LB.

The anamorphic convex lens that forms the blue light adjustment lens is so configured that the curvature of the convex surface in the lengthwise direction W1 (Z-axis direction) of the light emission surface 715c of the semiconductor laser chip 715 shown in FIG. 9 is greater than the curvature of the convex surface in the widthwise direction W2 (Y-axis direction) of the light emission surface 715c shown in FIG. 8. The anamorphic convex lens is therefore so configured that the power of the lens in the lengthwise direction W1 of the light emission surface 715c of the semiconductor laser chip 715 is greater than the power of the lens in the widthwise direction W2 of the light emission surface 715c.

The other configurations of the illuminator 41 are the same as those in the first embodiment.

Also in the present embodiment, the same effect as that provided by the first embodiment, that is, the color unevenness can be suppressed with no increase in the overall length of the rod integrator 20, whereby a compact illuminator 41 can be achieved.

The divergence angel γ2 of the light in the lengthwise direction W1 of the light emission surface 715c of the semiconductor laser chip 715 is smaller than the divergence angel γ1 of the light in the widthwise direction W2 of the light emission surface 715c, as shown in FIG. 4. Therefore, if the power of the blue light adjustment lens is fixed irrespective of the direction, the angle of incidence of the blue light LB incident on the rod integrator 20 cannot be sufficiently increased in the lengthwise direction W1 of the light emission surface 715c, in which the divergence angle of the light is small, and it is therefore conceivable that the degree of homogenization of the optical intensity of the blue light LB is insufficient.

In contrast, in the present embodiment, the blue light adjustment lens 42, which is so configured that the power of the lens in the lengthwise direction W1 of the light emission surface 715c, in which the divergence angle of the blue light LB is relatively small, is greater than the power of the lens in the widthwise direction W2 of the light emission surface 715c, in which the divergence angle of the blue light LB is relatively large, can increase the angle of incidence of the blue light LB both in the lengthwise direction W1 and the widthwise direction W2. The uniformity of the optical intensity of the blue light LB can therefore be increased both in the lengthwise direction W1 and the widthwise direction W2.

In the present embodiment, an anamorphic convex lens is used as the blue light adjustment lens 42, and an anamorphic concave lens may instead be used. Also in this case, the same effect as that provided by the present embodiment can be provided.

The technical range of the invention is not limited to the embodiments described above, and a variety of changes can be made thereto to the extent that the changes do not depart from the substance of the invention.

For example, in the embodiments described above, the light focusing lens and the blue light adjustment lens are formed of lenses separate from each other, and these lenses may instead be integrated with each other. That is, a lens formed of what is called a bifocal lens, which is a lens surface having a central portion that transmits the blue light and a peripheral portion with the curvature in the central portion different from the curvature in the peripheral portion, may be provided between the light source apparatus and the rod integrator. In this case, the bifocal lens serves not only as the light focusing lens but as the blue light adjustment lens. The number of parts of the illuminator and the size thereof can therefore be reduced.

Further, in the embodiments described above, the light source apparatus including one blue semiconductor laser, three green semiconductor lasers, and three red semiconductor lasers is presented by way of example, but the numbers of color semiconductor lasers are not limited thereto. For example, the light source apparatus may include a plurality of blue semiconductor lasers. In this case, the plurality of green semiconductor lasers and the plurality of red semiconductor lasers may be provided rotationally symmetric around the central axis of the entire light flux formed of the plurality of blue light beams emitted from the plurality of blue semiconductor lasers. Instead, the same-color semiconductor lasers are not necessarily disposed in a rotationally symmetric arrangement and may, for example, be disposed in a lattice arrangement having two directions perpendicular to each other.

The number, the arrangement, the shape, the material, the dimension, and other factors of components of the light source apparatus, the illuminator, and the projector presented in the embodiments described above can be changed as appropriate.

In the embodiments described above, the case where the light source apparatus according to each of the embodiments of the invention is used in a projector is presented by way of example, but not necessarily. The light source apparatus according to each of the embodiments of the invention may be used as a headlight of an automobile or any other lighting apparatus.

The entire disclosure of Japanese Patent Application No. 2018-005838, filed on Jan. 17, 2018 is expressly incorporated by reference herein.

What is claimed is:

1. An illuminator comprising:
a light source apparatus including one or more first light emitters that each emit first light having a first color in a first direction, a plurality of second light emitters that each emit second light having a second color different from the first color in the first direction, and a plurality of third light emitters that each emit third light having a third color different from the first and second colors in the first direction;
a rod integrator that is provided on a light exiting side of the light source apparatus and combines the first light, the second light, and the third light with one another;
a first lens that is provided on the light exiting side of the light source apparatus and causes the first light, the second light, and the third light to be focused in the rod integrator; and
a second lens that is provided on the light exiting side of the light source apparatus and transmits only the first light out of the first light, the second light, and the third light,
wherein the plurality of second light emitters and the plurality of third light emitters are so disposed as to surround the one or more first light emitters when the light source apparatus is viewed along the first direction.

2. The illuminator according to claim 1,
wherein a light emission efficiency of each of the one or more first light emitters is higher than a light emission efficiency of each of the plurality of second light emitters and a light emission efficiency of each of the plurality of third light emitters,
the number of plurality of second light emitters is greater than the number of one or more first light emitters, and
the number of plurality of third light emitters is greater than the number of one or more first light emitters.

3. The illuminator according to claim 2, wherein the first light is blue light, the second light is green light, and the third light is red light.

4. The illuminator according to claim 1,
wherein the plurality of second light emitters are so provided rotationally symmetric around a central axis of the first light as to surround the one or more first light emitters, and
the plurality of third light emitters are so provided rotationally symmetric around the central axis of the first light as to surround the one or more first light emitters.

5. The illuminator according to claim 4, wherein the second lens is so disposed that a central axis of the second lens coincides with the center axis of the first light.

6. The illuminator according to claim 5, wherein the second lens is a spherical convex lens or a spherical concave lens.

7. The illuminator according to claim 5, wherein the second lens is an anamorphic convex lens or an anamorphic concave lens.

8. The illuminator according to claim 7,
wherein the first light emitters, the second light emitters, and the third emitters each include a semiconductor laser chip, and
the anamorphic convex lens or the anamorphic concave lens is so configured that power of the lens in a lengthwise direction of a light emission surface of the semiconductor laser chip is greater than power of the lens in a widthwise direction of the light emission surface.

9. The illuminator according to claim 1, wherein the first lens and the second lens are integrated with each other.

10. A projector comprising:
the illuminator according to claim 1;
a light modulator that modulates light from the illuminator in accordance with image information to form image light; and
a projection optical apparatus that projects the image light.

11. A projector comprising:
the illuminator according to claim 2;
a light modulator that modulates light from the illuminator in accordance with image information to form image light; and
a projection optical apparatus that projects the image light.

12. A projector comprising:
the illuminator according to claim 3;
a light modulator that modulates light from the illuminator in accordance with image information to form image light; and
a projection optical apparatus that projects the image light.

13. A projector comprising:
the illuminator according to claim 4;
a light modulator that modulates light from the illuminator in accordance with image information to form image light; and
a projection optical apparatus that projects the image light.

14. A projector comprising:
the illuminator according to claim 5;
a light modulator that modulates light from the illuminator in accordance with image information to form image light; and
a projection optical apparatus that projects the image light.

15. A projector comprising:
the illuminator according to claim 6;
a light modulator that modulates light from the illuminator in accordance with image information to form image light; and
a projection optical apparatus that projects the image light.

16. A projector comprising:
the illuminator according to claim 7;
a light modulator that modulates light from the illuminator in accordance with image information to form image light; and
a projection optical apparatus that projects the image light.

17. A projector comprising:
the illuminator according to claim 8;
a light modulator that modulates light from the illuminator in accordance with image information to form image light; and
a projection optical apparatus that projects the image light.

18. A projector comprising:
the illuminator according to claim 9;

a light modulator that modulates light from the illuminator in accordance with image information to form image light; and a projection optical apparatus that projects the image light.

* * * * *